US012486786B2

(12) United States Patent
Sobanski et al.

(10) Patent No.: US 12,486,786 B2
(45) Date of Patent: Dec. 2, 2025

(54) SUPPORTING ELONGATED ROTATING ASSEMBLY WITHIN A TURBINE ENGINE

(71) Applicant: RTX Corporation, Farmington, CT (US)

(72) Inventors: Jon E. Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/196,690

(22) Filed: May 12, 2023

(65) Prior Publication Data

US 2024/0376834 A1 Nov. 14, 2024

(51) Int. Cl.
*F01D 25/16* (2006.01)
*F01D 25/12* (2006.01)

(52) U.S. Cl.
CPC ............. *F01D 25/16* (2013.01); *F01D 25/12* (2013.01); *F05D 2220/32* (2013.01); *F05D 2240/54* (2013.01); *F05D 2260/213* (2013.01)

(58) Field of Classification Search
CPC ........ F01D 25/16; F01D 25/162; F01D 25/30; F05D 220/32
See application file for complete search history.

(56) References Cited

U.S. PATENT DOCUMENTS

| 3,266,564 | A | 8/1966 | Sabatiuk |
|---|---|---|---|
| 3,604,207 | A | 9/1971 | Waidelich |
| 3,646,760 | A | 3/1972 | Waidelich |
| 4,998,995 | A | 3/1991 | Blythe |
| 10,352,274 | B2 | 7/2019 | Suciu |
| 2019/0360356 | A1 | 11/2019 | Savaria |
| 2023/0054748 | A1 | 2/2023 | Martin |

OTHER PUBLICATIONS

EP Search Report for EP Patent Application No. 24163037.5 dated Dec. 3, 2024.

*Primary Examiner* — Courtney D Heinle
*Assistant Examiner* — John S Hunter, Jr.
(74) *Attorney, Agent, or Firm* — Getz Balich LLC

(57) ABSTRACT

A turbine engine is provided that includes a first rotating assembly, a bearing, a turbine engine core and a flowpath. The first rotating assembly includes a propulsor rotor, a power turbine rotor and a power turbine shaft coupled with and axially between the propulsor rotor and the power turbine rotor. The bearing rotatably supports the first rotating assembly at an intermediate location along the power turbine shaft. The turbine engine core includes a second rotating assembly and a combustor. The second rotating assembly includes a core compressor rotor and a core turbine rotor. The power turbine rotor is arranged axially between the propulsor rotor and the second rotating assembly. The flowpath extends sequentially across the core compressor rotor, the combustor, the core turbine rotor and the power turbine rotor from an inlet into the flowpath to an exhaust from the flowpath.

16 Claims, 9 Drawing Sheets

SUPPORTING ELONGATED ROTATING ASSEMBLY WITHIN A TURBINE ENGINE

GOVERNMENT LICENSE RIGHTS

This invention was made with Government support under Contract DE-AR0001561 awarded by the United States Department of Energy, Office of ARPA-E. The Government has certain rights in the invention.

BACKGROUND OF THE DISCLOSURE

1. Technical Field

This disclosure relates generally to a turbine engine and, more particularly, to supporting an elongated rotating assembly within the turbine engine.

2. Background Information

A gas turbine engine includes one or more rotating assemblies. Various techniques are known in the art for supporting these rotating assemblies. While these known support techniques have various benefits, there is still room in the art for improvement.

SUMMARY OF THE DISCLOSURE

According to an aspect of the present disclosure, a turbine engine is provided that includes a first rotating assembly, a bearing, a turbine engine core and a flowpath. The first rotating assembly includes a propulsor rotor, a power turbine rotor and a power turbine shaft coupled with and axially between the propulsor rotor and the power turbine rotor. The bearing rotatably supports the first rotating assembly at an intermediate location along the power turbine shaft. The turbine engine core includes a second rotating assembly and a combustor. The second rotating assembly includes a core compressor rotor and a core turbine rotor. The power turbine rotor is arranged axially between the propulsor rotor and the second rotating assembly. The flowpath extends sequentially across the core compressor rotor, the combustor, the core turbine rotor and the power turbine rotor from an inlet into the flowpath to an exhaust from the flowpath.

According to another aspect of the present disclosure, another turbine engine is provided that includes a first rotating assembly, a bearing, a turbine engine core and a flowpath. The first rotating assembly includes a propulsor rotor and a power turbine rotor. The bearing rotatably supports the first rotating assembly axially between the propulsor rotor and the power turbine rotor. The turbine engine core includes a second rotating assembly and a combustor. The second rotating assembly includes a core compressor rotor and a core turbine rotor. The recovery system includes a condenser and an evaporator. The bearing is disposed axially between the condenser and the evaporator. The flowpath extends sequentially across the core compressor rotor, the combustor, the core turbine rotor, the power turbine rotor, the evaporator and the condenser from an inlet into the flowpath to an exhaust from the flowpath.

According to still another aspect of the present disclosure, another turbine engine is provided that includes a first rotating assembly, a turbine engine core and a flowpath. The first rotating assembly includes a propulsor rotor, a power turbine rotor and a first compressor rotor axially between the propulsor rotor and the power turbine rotor. The turbine engine core includes a second rotating assembly and a combustor. The second rotating assembly includes a core compressor rotor and a core turbine rotor. The flowpath extends sequentially across the core compressor rotor, the combustor, the core turbine rotor, the power turbine rotor and the first compressor rotor from an inlet into the flowpath to an exhaust from the flowpath.

The turbine engine may also include a bearing compartment and a bearing. The first compressor rotor may be disposed axially adjacent the bearing compartment. The bearing may rotatably support the first rotating assembly and may be disposed within the bearing compartment.

The turbine engine may also include a recovery system that includes a condenser and an evaporator. The flowpath may extend sequentially across the evaporator, the first compressor rotor and the condenser from the inlet to the exhaust.

The turbine engine may also include a stationary support structure supporting the bearing and disposed axially between the condenser and the evaporator. The flowpath may also extend through the stationary support structure.

The intermediate location may be disposed along a middle one-half of the power turbine shaft.

The turbine engine may also include a forward bearing and an aft bearing. The forward bearing may rotatably support the first rotating assembly at a forward end of the power turbine shaft. The aft bearing may rotatably support the first rotating assembly at an aft end of the power turbine shaft. The bearing may be a mid-bearing disposed axially between the forward bearing and the aft bearing.

The turbine engine may also include a support structure that includes an inner case, an outer case and a plurality of struts arranged circumferentially about an axis in an array. The inner case may circumscribe and support the bearing. The outer case may circumscribe the inner case. Each of the struts may extend radially between and may be connected to the inner case and the outer case.

The flowpath may not extend across the support structure.

The flowpath may extend across the support structure and radially between the inner case and the outer case.

The support structure may be disposed between the power turbine rotor and the exhaust along the flowpath.

The first rotating assembly may also include a second compressor rotor. The second compressor rotor may be disposed between the power turbine rotor and the exhaust along the flowpath.

The second compressor rotor may be axially between the propulsor rotor and the bearing.

The turbine engine may also include an accessory gearbox and a drivetrain coupling the first rotating assembly to the accessory gearbox.

The turbine engine may also include an evaporator and a condenser. The evaporator may be fluidly coupled between the power turbine rotor and the exhaust along the flowpath. The condenser may be fluidly coupled between the evaporator and the exhaust along the flowpath.

The turbine engine may also include a support structure supporting the bearing and disposed between the evaporator and the condenser along the flowpath.

The turbine engine may also include a second compressor rotor disposed between the evaporator and the condenser along the flowpath.

The turbine engine may also include an accessory gearbox and a drivetrain coupling the first rotating assembly to the accessory gearbox. The drivetrain may be disposed axially between the evaporator and the condenser.

The turbine engine may also include a recovery system that includes the condenser and the evaporator. The condenser may be configured to condense water vapor flowing through the flowpath into water. The recovery system may be configured to collect the water. The evaporator may be configured to evaporate at least some of the water into steam. The recovery system may be configured to provide the steam to the turbine engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
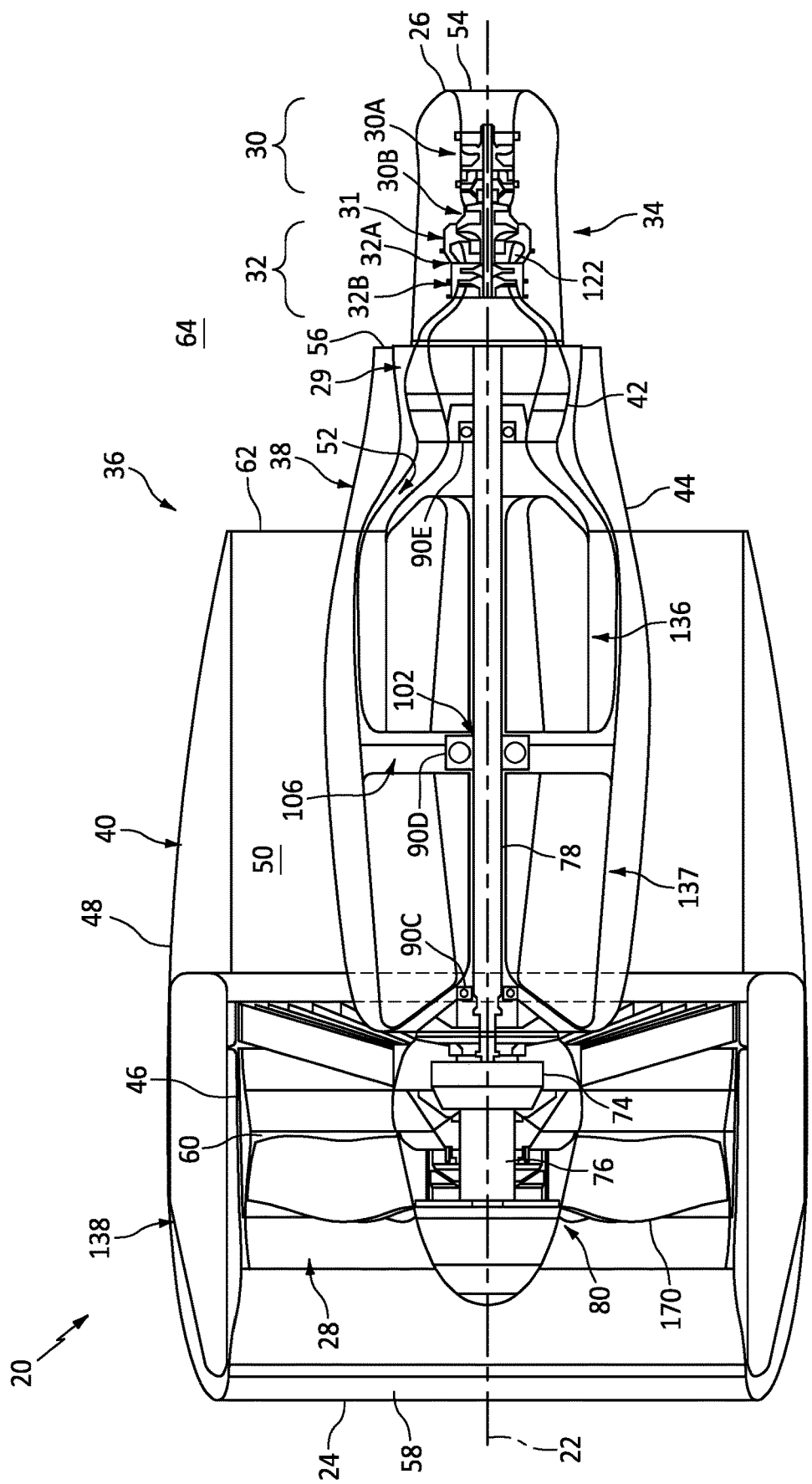
FIG. 1 is a side sectional illustration of a turbine engine.

FIG. 1 is a side sectional illustration of a gas turbine engine 20 for an aircraft propulsion system. This turbine engine 20 extends axially along a centerline axis 22 between a forward, upstream end 24 and an aft, downstream end 26. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 may be arranged sequentially along the axis 22 within an engine housing 36. This engine housing 36 includes a housing inner structure 38 and a housing outer structure 40. The housing inner structure 38 includes a housing inner case 42 and an inner nacelle 44, and the housing outer structure 40 includes a housing outer case 46 and an outer nacelle 48. The inner case 42 may house one or more of the engine sections 29-32B; see also FIG. 2. The outer case 46 may house at least the fan section 28. The inner nacelle 44 houses and provides an aerodynamic cover over at least the inner case 42. The outer nacelle 48 houses and provides an aerodynamic cover over at least the outer case 46. The outer nacelle 48 of FIG. 1 is also disposed radially outboard of, extends circumferentially about (e.g., circumscribes) and extends axially along (e.g., overlaps) at least a forward portion of the inner nacelle 44. With this arrangement, the inner nacelle 44 and the outer nacelle 48 form a bypass flowpath 50 within the engine housing 36.

A core flowpath 52 extends sequentially through or otherwise across the LPC section 30A, the HPC section 30B, the core combustor section 31, the HPT section 32A, the LPT section 32B and the PT section 29 from an inlet 54 into the core flowpath 52 to an exhaust 56 out from the core flowpath 52. The core flowpath inlet 54 of FIG. 1 is disposed at (e.g., on, adjacent or proximate) the engine downstream end 26. The core flowpath exhaust 56 of FIG. 1 is disposed axially forward, upstream of the core flowpath inlet 54. The core flowpath exhaust 56 of FIG. 1, for example, is disposed radially outboard of and may be axially aligned with the PT section 29. By contrast, an inlet 58 into the turbine engine 20 of FIG. 1 is disposed at the engine upstream end 24. An inlet 60 to the bypass flowpath 50 is disposed downstream of the fan section 28 and axially aft, downstream of the engine inlet 58. An exhaust 62 from the bypass flowpath 50 is disposed axially aft, downstream of the bypass flowpath inlet 60. This bypass flowpath exhaust 62 of FIG. 1 is also radially outboard of the core flowpath 52 and its core flowpath exhaust 56. The bypass flowpath exhaust 62 may be disposed axially forward, upstream of the core flowpath exhaust 56.

Figure 2:
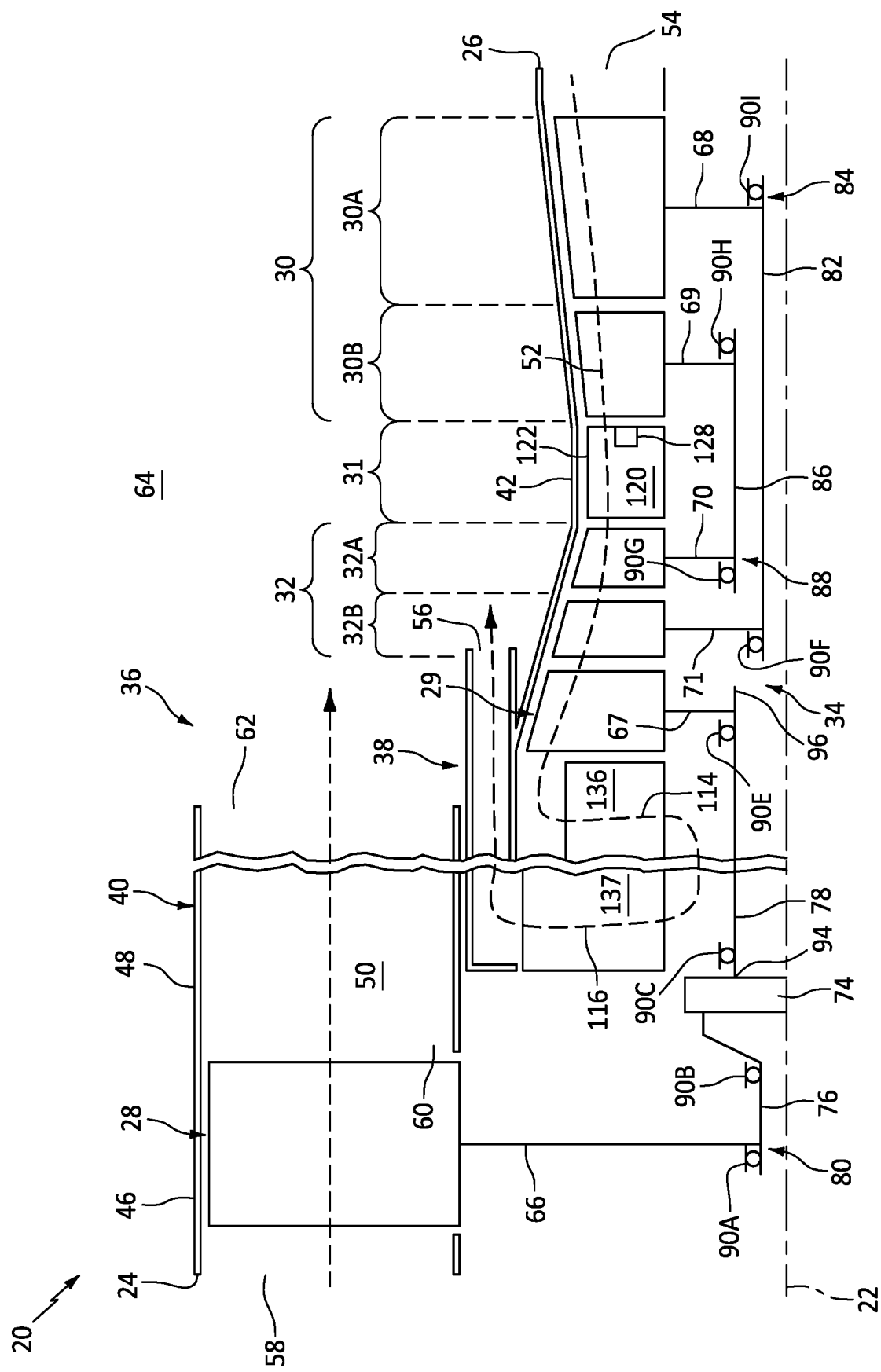
FIG. 2 is a partial schematic illustration of the turbine engine.

Referring to FIG. 2, the engine core 34 may be configured as a reverse flow engine core. The core flowpath 52 of FIG. 2, for example, extends through any one or more or all of the engine sections 30A-32B and 29 in an axially forward direction. Similarly, the turbine engine 20 is configured to move through an environment 64 external (e.g., outside of) to the turbine engine 20 in the axially forward direction; e.g., during forward aircraft flight. By contrast, the bypass flowpath 50 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 66-71. Each of these bladed rotors 66-71 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 66 is connected to a geartrain 74 through a fan shaft 76. The geartrain 74 is connected to the power turbine (PT) rotor 67 through a power turbine (PT) shaft 78. At least (or only) the fan rotor 66, the fan shaft 76, the geartrain 74, the PT shaft 78 and the PT rotor 67 collectively form a fan rotating assembly 80. This fan rotating assembly 80 of FIG. 2 is configured as a geared rotating assembly where, for example, the PT rotor 67 rotates at a different (e.g., faster) speed than the fan rotor 66. However, it is contemplated the fan rotating assembly 80 may alternatively be a direct drive rotating assembly where, for example, the fan shaft 76 and the geartrain 74 are omitted and the PT shaft 78 directly connects the fan rotor 66 and the PT rotor 67 together. Referring again to FIG. 2, the LPC rotor 68 is connected to the LPT rotor 71 through a low speed shaft 82. At least (or only) the LPC rotor 68, the low speed shaft 82 and the LPT rotor 71 collectively form a low speed rotating assembly 84 of the engine core 34. The HPC rotor 69 is connected to the HPT rotor 70 through a high speed shaft 86. At least (or only) the HPC rotor 69, the high speed shaft 86 and the HPT rotor 70 collectively form a high speed rotating assembly 88 of the engine core 34. Each of the engine rotating assemblies 80, 84, 88 may be rotatable about the axis 22. These engine rotating assemblies 80, 84 and 88 may be rotatably connected to and supported by the engine housing 36 through a plurality of bearings 90A-I (generally referred to as "90") (bearing 90D shown in FIG. 1).

Figure 3:
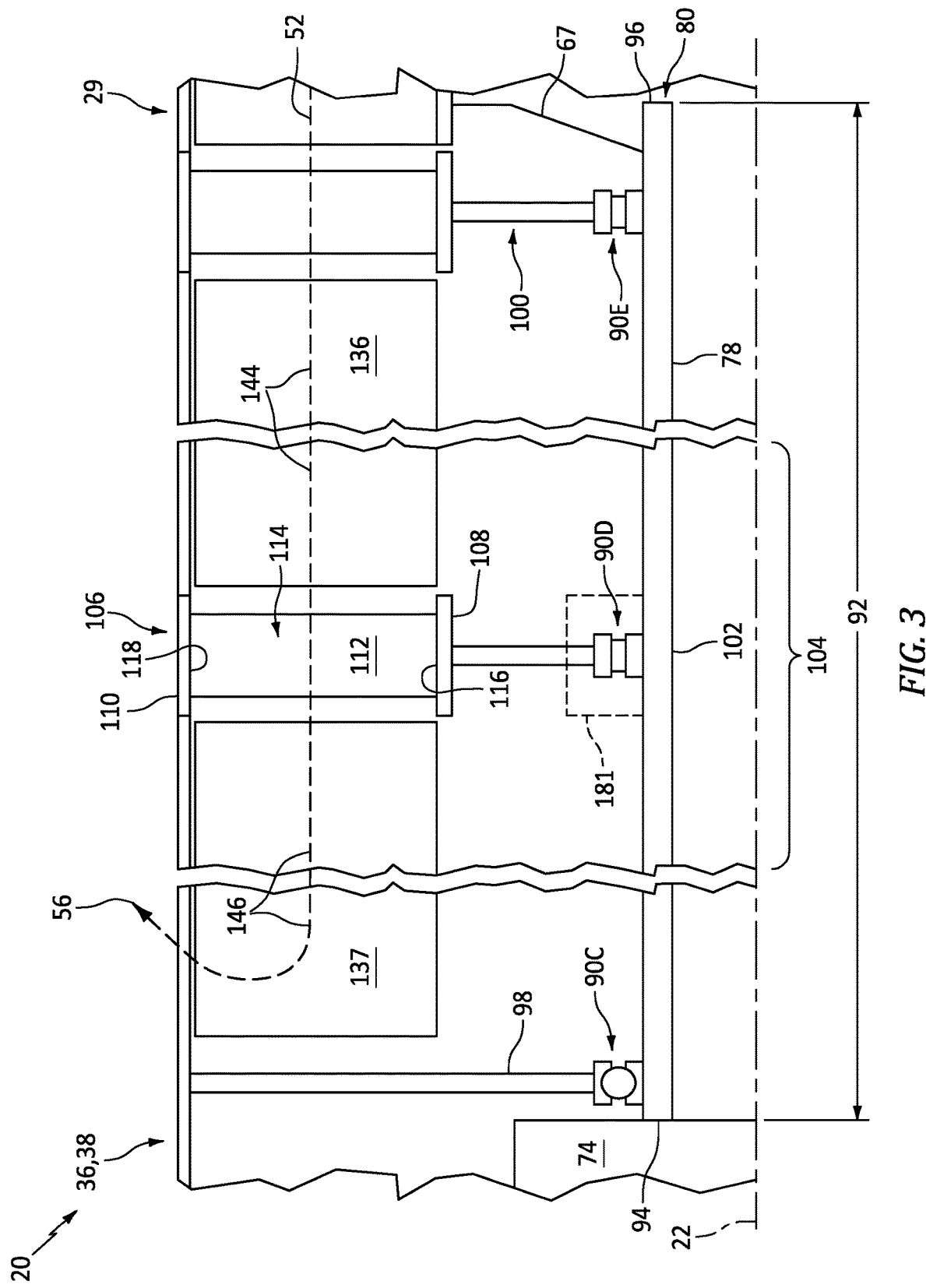
FIG. 3 is a partial schematic illustration of the turbine engine along a power turbine shaft.

Referring to FIG. 3, the fan rotating assembly 80 is rotatably supported by multiple of the bearings (e.g., 90C-E) along and/or proximate the PT shaft 78. The PT shaft 78 of FIG. 3, for example, has a shaft length 92 that extends axially along the axis 22 from a forward end 94 of the PT shaft 78 to an aft end 96 of the PT shaft 78.

The forward bearing 90C supports the fan rotating assembly 80 at or about the shaft forward end 94. The forward bearing 90C of FIG. 3, for example, circumscribes and mounts the PT shaft 78 to the engine housing 36 and its housing inner structure 38 through a forward support structure 98. This forward bearing 90C may be located along a forward one-third (⅓), a forward one-quarter (¼) or a forward one-fifth (⅕) of the shaft length 92.

The aft bearing 90E supports the fan rotating assembly 80 at or about the shaft aft end 96. The aft bearing 90E of FIG. 3, for example, circumscribes and mounts the PT shaft 78 to the engine housing 36 and its housing inner structure 38 through an aft support structure 100; e.g., a turbine exhaust case (TEC). This aft bearing 90E may be located along an aft one-third (⅓), an aft one-quarter (¼) or an aft one-fifth (⅕) of the shaft length 92.

The mid-bearing 90D supports the fan rotating assembly 80 and its PT shaft 78 at an intermediate location 102 along the PT shaft 78. The mid-bearing 90D of FIG. 3, for example, circumscribes and mounts a middle region 104 of the PT shaft 78 to the engine housing 36 and its housing inner structure 38 through a mid-support structure 106.

The mid-support structure 106 may include a tubular support structure inner case 108, a tubular support structure outer case 110 and a plurality of struts 112 arranged circumferentially about the axis 22 in an array; e.g., a circular array. The inner case 108 extends circumferentially about (e.g., extends completely around, circumscribes) and supports the mid-bearing 90D. For example, an outer race of the mid-bearing 90D may be nested within and fixed to the inner case 108, or a frame within the inner case 108 (schematically shown). The outer case 110 extends circumferentially about (e.g., extends completely around, circumscribes) the inner case 108 and the array of struts 112. This outer case 110 may be configured as a part of the engine housing 36 and its housing inner structure 38. Alternatively, the outer case 110 may be disposed within and connected (e.g., fixedly attached) to the engine housing 36 and its housing inner structure 38. Each of the struts 112 extends radially between and is connected to the inner case 108 and the outer case 110. With this arrangement, the mid-support structure 106 may structurally tie the mid-bearing 90D to the outer case 110/the housing inner structure 38.

The intermediate location 102 is disposed axially along the axis 22 between the forward bearing 90C and the aft bearing 90E. The intermediate location 102 is also disposed axially between (A) the fan rotating assembly component(s) 66, 74 and/or 76 (see also FIG. 1) and (B) the PT rotor 67 and/or the engine core 34 (see also FIG. 1). This intermediate location 102 may be disposed along a middle one-half (½), a middle one-third (⅓), a middle one-fourth (¼) or even a middle one-fifth (⅕) of the shaft length 92. In general, the intermediate location 102 is ideally positioned on or as close as possible to an axial center point between the shaft forward end 94 and the shaft aft end 96. The position of the intermediate location 102, however, may be axially skewed forward or aft from the axial center point along the axis 22 (e.g., within the above ranges) to facilitate arrangement of other components (e.g., 178 of FIG. 7 and/or 184 of FIG. 8) along the PT shaft 78. By positioning the mid-bearing 90D at its intermediate location 102 along the middle region 104 of the PT shaft 78, the mid-bearing 90D may reduce or prevent potential PT-shaft wobble during rotation of the fan rotating assembly 80 and its PT shaft 78. Here, the term "wobble" may describe periodic radial outward deflection of a (e.g., unsupported) elongated portion of a shaft during shaft rotation.

The mid-support structure 106 of FIG. 3 may also include an internal passage 114 for fluid flow; e.g., an annular passage. A radial outer surface 116 of the inner case 108 of FIG. 3 forms a radial inner peripheral boundary of the internal passage 114. A radial inner surface 118 of the outer case 110 of FIG. 3 forms a radial outer peripheral boundary of the internal passage 114. Each of the struts 112 extends radially across the internal passage 114 from the inner case 108 to the outer case 110. In some embodiments, each strut 112 may also be configured as a vane where an exterior surface of that structure is exposed to fluid flow passing through the internal passage 114. In other embodiments, each strut 112 may extend radially through a fairing where an exterior surface of that fairing is exposed to fluid flow passing through the internal passage 114. In both embodiments, the internal passage 114 may form a section of the core flowpath 52 across (e.g., axially through) the mid-support structure 106. Here, the mid-support structure 106 and its internal passage 114 are fluidly coupled inline along the core flowpath 52 between the PT section 29 and the core flowpath exhaust 56. The present disclosure, however, is not limited to such an exemplary arrangement as described below in further detail.

Referring again to FIG. 2, air enters the turbine engine 20 and its engine core 34 during operation at the engine downstream end 26 through the core flowpath inlet 54. This air directed into the core flowpath 52 may be referred to as "core air". Air also enters the turbine engine 20 at the engine upstream end 24 through the engine inlet 58. This air is directed through the fan section 28 and into the bypass flowpath 50. The air within the bypass flowpath 50 may be referred to as "bypass air".

The core air is compressed by the LPC rotor 68 and the HPC rotor 69 and directed into a combustion chamber 120 of a combustor 122 (e.g., an annular combustor) in the combustor section 31. Fuel is injected into the combustion chamber 120 and mixed with the compressed core air to provide a fuel-air mixture. This fuel-air mixture is ignited and combustion products thereof flow through and sequentially cause the HPT rotor 70, the LPT rotor 71 and the PT rotor 67 to rotate. The rotation of the HPT rotor 70 and the LPT rotor 71 respectively drive rotation of the HPC rotor 69 and the LPC rotor 68 and, thus, compression of the air received from the core flowpath inlet 54. The rotation of the PT rotor 67 (e.g., independently) drives rotation of the fan rotor 66, which propels the bypass air through and out of the bypass flowpath 50. The propulsion of the bypass air may account for a majority of thrust generated by the turbine engine 20.

Figure 4:
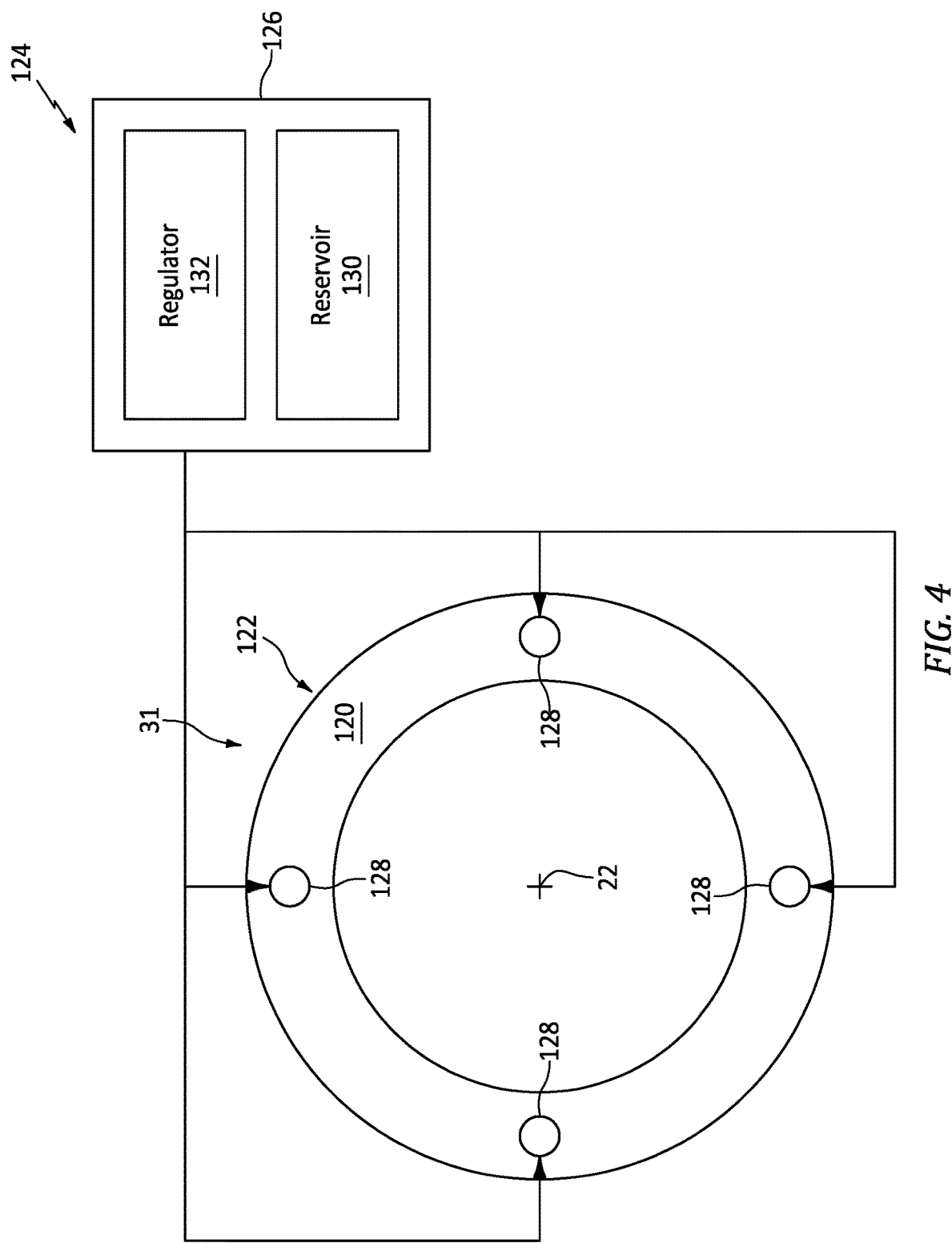
FIG. 4 is a schematic illustration of a fuel system for the turbine engine.

Referring to FIG. 4, the turbine engine 20 includes a fuel system 124 for delivering the fuel to the combustor 122. This fuel system 124 includes a fuel source 126 and one or more fuel injectors 128. The fuel source 126 of FIG. 4 includes a fuel reservoir 130 and/or a fuel flow regulator 132; e.g., a valve. The fuel reservoir 130 is configured to store the fuel before, during and/or after turbine engine operation. The fuel reservoir 130, for example, may be configured as or otherwise include a tank, a cylinder, a pressure vessel, a bladder or any other type of fuel storage container. The fuel flow regulator 132 is configured to direct and/or meter a flow of the fuel from the fuel reservoir 130 to the fuel injectors 128. The fuel injectors 128 may be arranged circumferentially about the axis 22 in an array. Each fuel injector 128 is configured to direct the fuel received from the fuel source 126 into the combustion chamber 120 for mixing with the compressed core air to provide the fuel-air mixture.

The turbine engine 20 of FIG. 1 may be configured as a non-hydrocarbon turbine engine/a hydrocarbon free turbine engine. The turbine engine 20, for example, may be configured as a hydrogen fueled turbine engine. The fuel injected into the combustion chamber 120 by the fuel injectors 128 (see FIG. 2), for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor for example.

Figure 5:
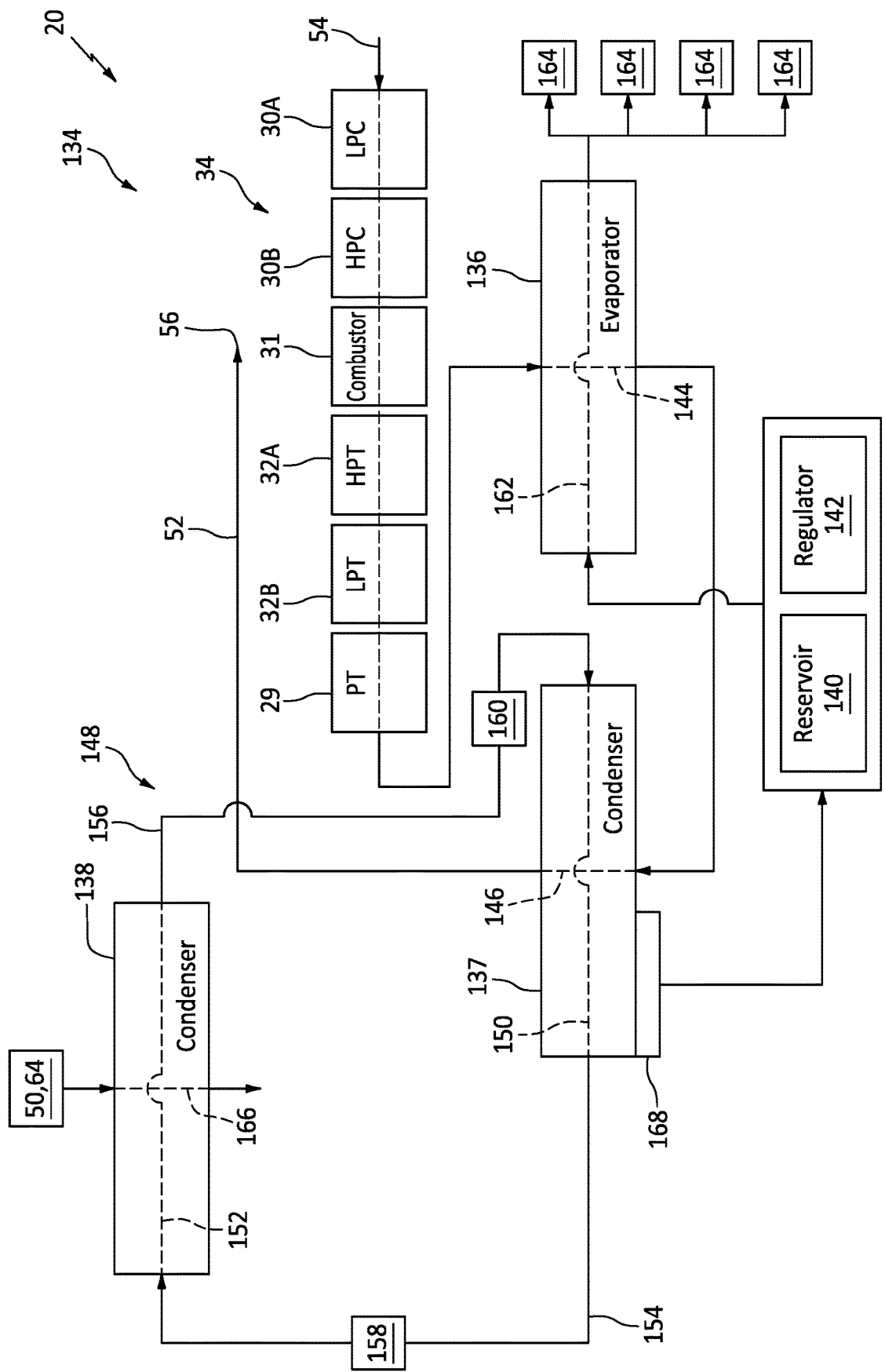
FIG. 5 is a schematic illustration of a water and heat energy recovery system arranged with other components of the turbine engine.

Referring to FIG. 5, the turbine engine 20 also includes a water and heat energy recovery system 134. This recovery system 134 is configured to recover at least some of the water vapor produced by the combustion of the fuel-air mixture within the combustion chamber 120 (see FIG. 2). The recovery system 134 is also configured to evaporate the recovered water using heat energy recuperated from the combustion products to provide steam for use in the engine core 34; e.g., in the combustor section 31. The recovery system 134 of FIG. 5, for example, includes a (e.g., annular or arcuate) water evaporator 136 and a (e.g., annular or arcuate) water condenser 137. The recovery system 134 may also include a (e.g., annular or arcuate) refrigerant condenser 138, a water reservoir 140 and/or a system flow regulator 142 (e.g., a pump and/or a valve).

The water evaporator 136 and the water condenser 137 are fluidly coupled inline with the core flowpath 52. For example, the core flowpath 52 of FIG. 5 extends from the PT section 29, sequentially through a gas (e.g., combustion products) flowpath 144 of the water evaporator 136 and a gas (e.g., combustion products) flowpath 146 of the water condenser 137, to the core flowpath exhaust 56. Referring to FIG. 3, the internal passage 114 is fluidly coupled between the gas flowpath 144 and the gas flowpath 146 along the core flowpath 52. The mid-support structure 106 of FIG. 3 and/or the mid-bearing 90D are also arranged axially between the water evaporator 136 and the water condenser 137 along the axis 22.

Referring again to FIG. 5, the water condenser 137 and the refrigerant condenser 138 are configured together in a refrigerant flow circuit 148. For example, a working fluid (e.g., refrigerant) flowpath 150 of the water condenser 137 and a working fluid (e.g., refrigerant) flowpath 152 of the refrigerant condenser 138 are fluidly coupled in a loop by a working fluid first passage 154 and a working fluid second passage 156. The first passage 154 may direct a working fluid (e.g., refrigerant or another coolant) from the water condenser 137 and its fluid flowpath 150 to the refrigerant condenser 138 and its fluid flowpath 152. The second passage 156 may direct the working fluid from the refrigerant condenser 138 and its fluid flowpath 152 to the water condenser 137 and its fluid flowpath 150. This refrigerant flow circuit 148 may also include a refrigerant flow regulator 158, 160 (e.g., a compressor, a pump and/or a valve) arranged inline with one or both of the working fluid passages 154, 156 to regulate circulation of the working fluid through the water condenser 137 and the refrigerant condenser 138.

The water reservoir 140 is configured to hold water before, during and/or after turbine engine operation. The water reservoir 140, for example, may be configured as or otherwise include a tank, a cylinder, a pressure vessel, a bladder or any other type of water storage container. The water reservoir 140 of FIG. 5 is fluidly coupled with and between the water condenser gas flowpath 146 and a water flowpath 162 of the water evaporator 136. The system flow regulator 142 is arranged with the water reservoir 140, and configured to direct and/or meter a flow of the water from the water reservoir 140 to one or more other components 164 of the turbine engine 20. One or more of the turbine engine components 164 may each be configured as or otherwise include a steam injector. Each steam injector may be configured to inject the steam into the combustion chamber 120 (see FIG. 2). One or more of the turbine engine components 164 may also or alternatively be configured as an outlet for introducing the steam for cooling the combustor 122; e.g., a combustor wall, etc. The present disclosure, however, is not limited to the foregoing exemplary turbine engine components 164 which utilize the steam. In particular, various other uses for steam in a turbine engine are known in the art, and the present disclosure is not limited to any particular one thereof.

During operation of the recovery system 134, relatively cool air is directed into an air flowpath 166 of the refrigerant condenser 138. The working fluid is directed into the refrigerant condenser fluid flowpath 152. The refrigerant condenser 138 exchanges heat energy between the air flowing within the refrigerant condenser air flowpath 166 and the working fluid flowing within the refrigerant condenser fluid flowpath 152. The working fluid flowing within the refrigerant condenser fluid flowpath 152 is typically warmer than the air flowing within the refrigerant condenser air flowpath 166. The refrigerant condenser 138 is thereby operable to cool the working fluid using the air. This air may be received (e.g., scooped and/or bled) from the bypass flowpath 50. Alternatively, the air may be received (e.g., scooped and/or ingested) from the external environment 64.

The cooled working fluid is directed into the water condenser fluid flowpath 150. The relatively hot combustion products, including the water vapor, are directed into the water condenser gas flowpath 146. The water condenser 137 exchanges heat energy between the working fluid flowing within the water condenser fluid flowpath 150 and the combustion products flowing within the water condenser gas flowpath 146. The combustion products flowing within the water condenser gas flowpath 146 are typically warmer than the working fluid flowing within the water condenser fluid flowpath 150. The water condenser 137 is thereby operable to cool the combustion products using the working fluid. This cooling of the combustion products may condense at least some of the water vapor (e.g., the gaseous water)

flowing within the water condenser gas passage 146 into liquid water droplets. At least some or all of the liquid water may be collected and separated from the remaining gaseous combustion products by a separator 168 and subsequently directed to the water reservoir 140 for (e.g., temporary) storage. Here, the separator 168 is configured as or otherwise includes a gutter paired with the water condenser 137. However, various other types of separators are known in the art, and the present disclosure is not limited to any particular ones thereof.

The system flow regulator 142 directs the water from the water reservoir 140 into and through the water evaporator water flowpath 162. The relatively hot combustion products are further directed through the water evaporator gas flowpath 144, for example, prior to flowing through the water condenser gas flowpath 146. The water evaporator 136 exchanges heat energy between the water flowing within the water evaporator water flowpath 162 and the combustion products flowing within the water evaporator gas flowpath 144. The combustion products flowing within the water evaporator gas flowpath 144 are typically warmer than the liquid water flowing within the water evaporator water flowpath 162. The water evaporator 136 is thereby operable to heat the water using the combustion products and thereby recuperate the heat energy from the combustion products. This heating of the water may evaporate at least some or all of the liquid water flowing within the water evaporator water flowpath 162 into gaseous water-steam. At least some of this steam is directed to the turbine engine components 164 for use in the engine core 34; e.g., use in the combustor section 31.

Figure 6:
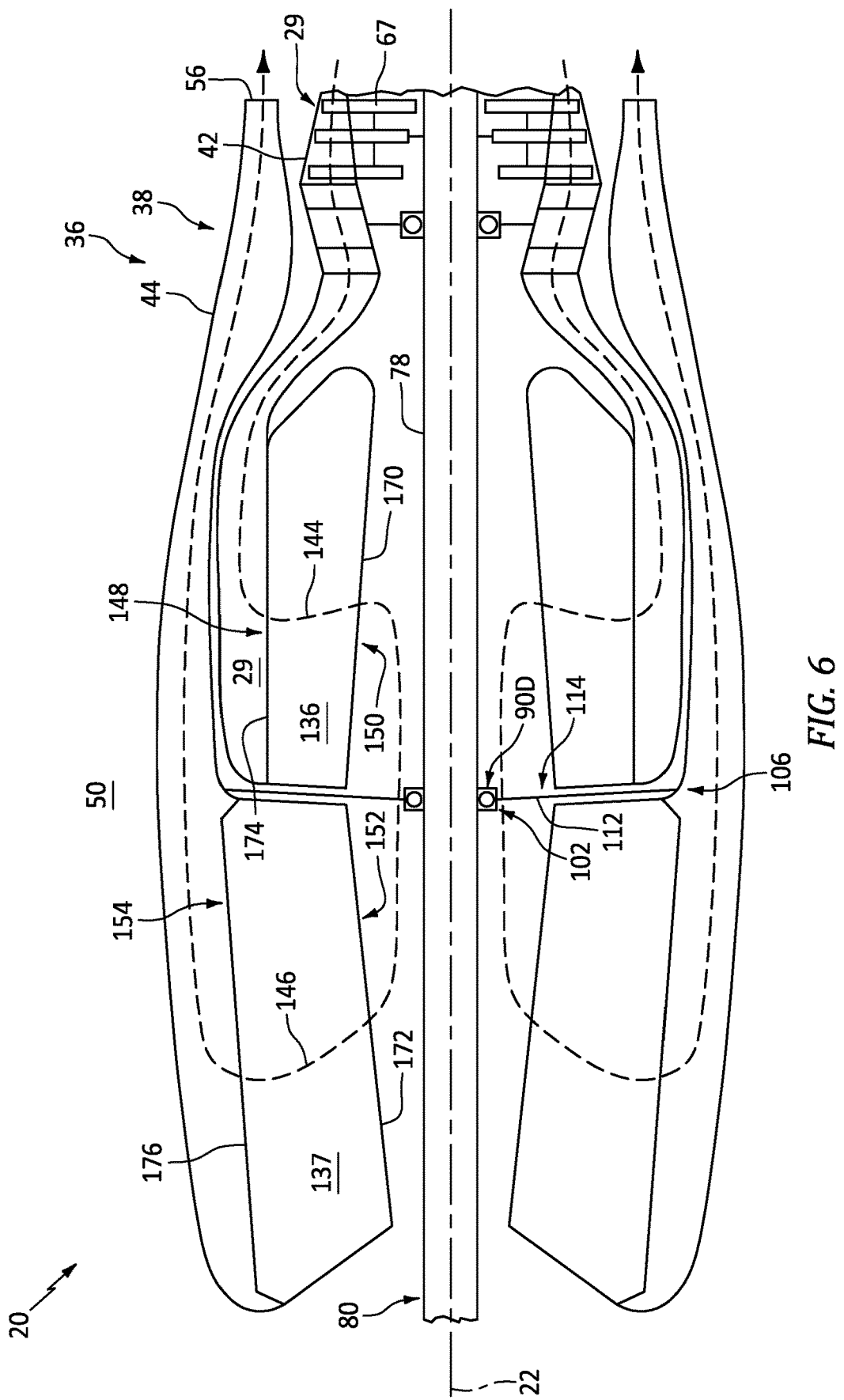
FIG. 6 is a partial schematic illustration of the turbine engine with an evaporator and a condenser within an inner housing structure.

Referring to FIG. 6, the water evaporator 136 and/or the water condenser 137 may be arranged at a central location within the turbine engine 20; e.g., a typical location for an engine core. Each heat exchanger 136, 137 of FIG. 2, for example, is positioned axially aft, downstream of the fan section 28 and axially forward, upstream of the PT section 29 and/or the engine core 34 and its core sections 30A-32B. More particularly, each heat exchanger 136, 137 is positioned axially between the fan section 28 and the PT section 29 along the axis 22. The water evaporator 136 may be positioned axially between (A) the water condenser 137, the mid-bearing 90D and/or the mid-support structure 106 (see FIG. 3) and (B) the PT section 29 and/or the engine core 34. The water condenser 137 may be positioned axially between (A) the water evaporator 136, the mid-bearing 90D and/or the mid-support structure 106 (see FIG. 3) and (B) the fan section 28 and its fan rotor 66 and/or the geartrain 74. Each heat exchanger 136, 137 extends axially along and circumferentially about (e.g., completely around) the axis 22. Referring to FIG. 6, each heat exchanger 136, 137 extends radially between and to an inner side 170, 172 of the respective heat exchanger 136, 137 and an outer side 174, 176 of the respective heat exchanger 136, 137. With this arrangement, the fan rotating assembly 80 and its PT shaft 78 may project axially along the axis 22 through a bore of each heat exchanger 136, 137. Each heat exchanger 136, 137 may thereby extend circumferentially about (e.g., circumscribe) and extend axially along (e.g., overlap) the fan rotating assembly 80 and its PT shaft 78. The inner nacelle 44 may also house (e.g., circumscribe and/or axially overlap) the water evaporator 136 and/or the water condenser 137 beneath (e.g., radially inboard of) the bypass flowpath 50.

Figure 7:
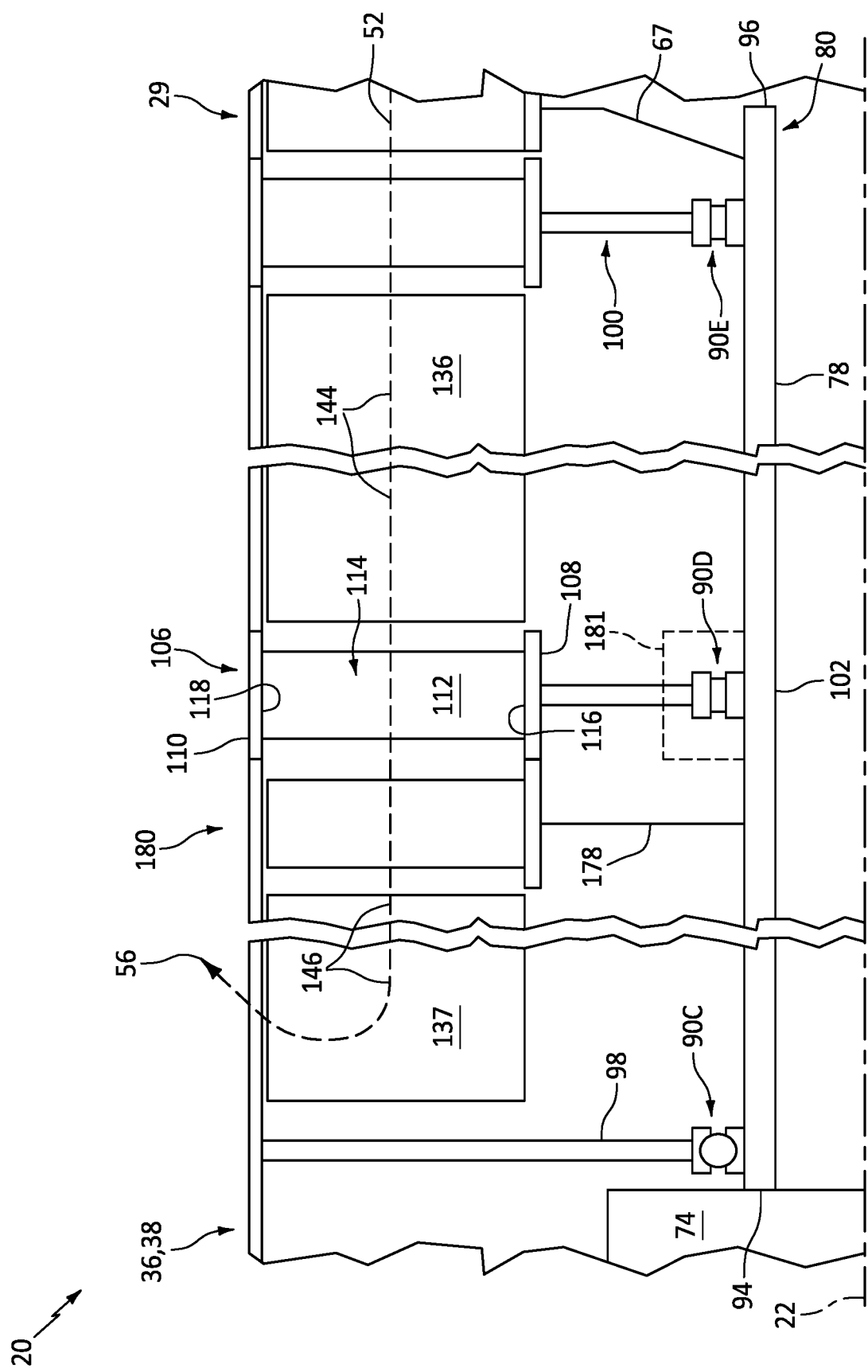
FIG. 7 is a partial schematic illustration of the turbine engine along the power turbine shaft with a supplemental compressor rotor coupled to the power turbine shaft.

In some embodiments, referring to FIG. 1, the PT rotor 67 may be configured to (e.g., only) drive rotation of the fan rotor 66. In other embodiments, referring to FIG. 7, the PT rotor 67 may also be configured to drive rotation of another bladed rotor such as a supplemental compressor rotor 178; e.g., an exhaust compressor. The fan rotating assembly 80 of FIG. 7, for example, also includes the compressor rotor 178. This compressor rotor 178 is disposed within a supplemental compressor section 180 (e.g., an exhaust compressor section) fluidly coupled inline along the core flowpath 52 between the PT section 29 and the core flowpath exhaust 56. More particularly, the compressor section 180 and its compressor rotor 178 of FIG. 7 are arranged, axially along the axis 22 and/or fluidly along the core flowpath 52, between the water evaporator 136 and the water condenser 137. The compressor rotor 178 of FIG. 7 is also arranged, axially along the axis 22 and/or fluidly along the core flowpath 52, between (A) the mid-support structure 106 and its internal passage 114 and (B) the water condenser 137. However, it is contemplated the compressor rotor 178 may alternatively be arranged between (A) the water evaporator 136 and (B) the mid-support structure 106 and its internal passage 114. In either position, the compressor rotor 178 is configured to boost a pressure of the combustion products exhausted from the water evaporator 136/directed into the water condenser 137. The compressor rotor 178 may thereby maintain a minimum combustion products pressure to account for, for example, pressure drop across the heat exchangers 136 and/or 137.

The compressor rotor 178 may be disposed near the mid-bearing 90D. The compressor rotor 178 of FIG. 7, for example, is disposed axially adjacent (or proximate) a bearing compartment 181 housing the mid-bearing 90D. The mid-bearing 90D may thereby also support rotation of the compressor rotor 178.

The compressor rotor 178 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Figure 8:
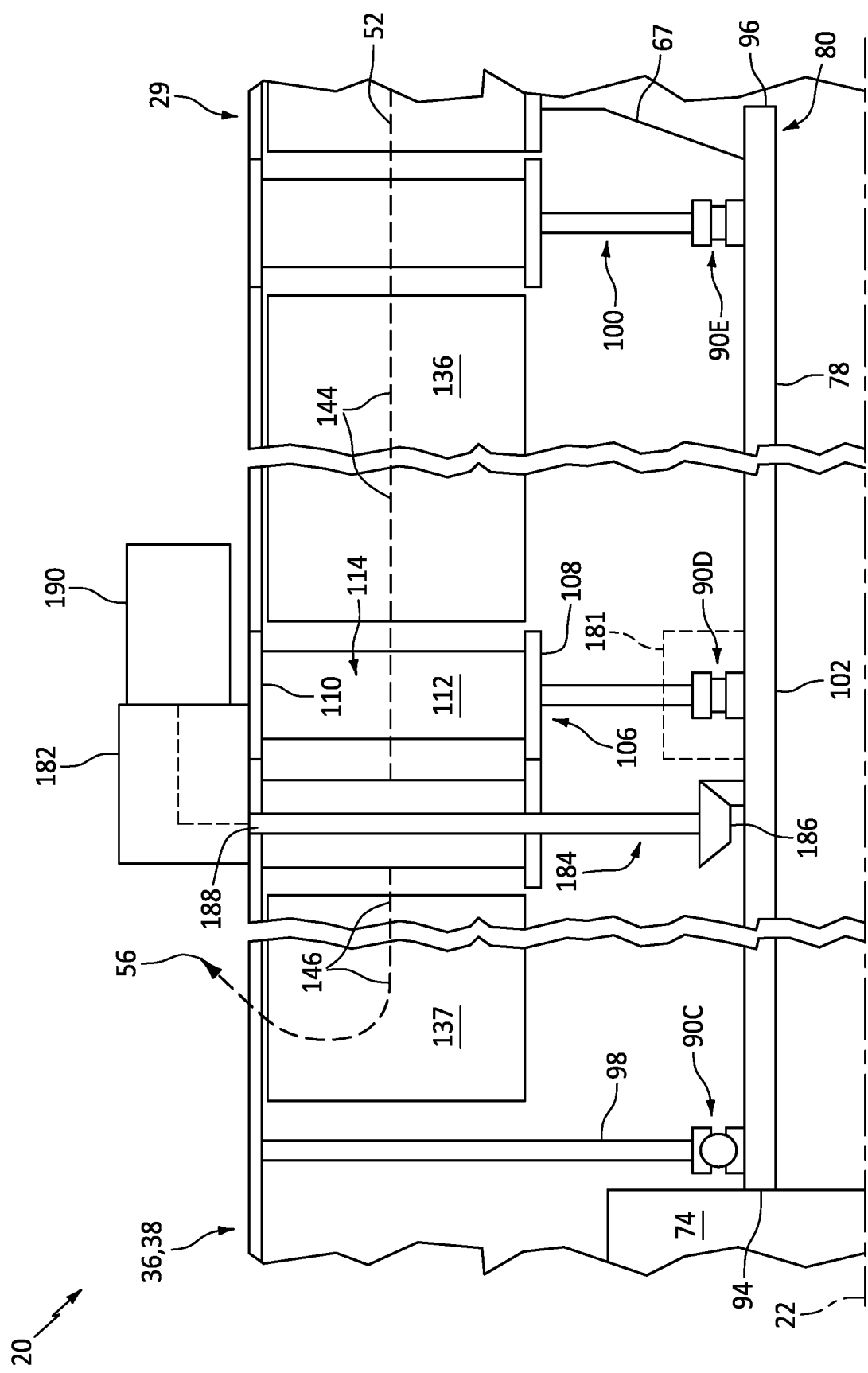
FIG. 8 is a partial schematic illustration of the turbine engine along the power turbine shaft with a drivetrain coupling the power turbine shaft to an accessory gearbox.

In some embodiments, referring to FIG. 8, the PT rotor 67 may also be configured to drive an accessory gearbox 182. This may be in addition to or in alternative to driving the supplemental compressor rotor 178 of FIG. 7. The accessory gearbox 182 of FIG. 8 is operatively coupled to the fan rotating assembly 80 and its PT shaft 78 through a drivetrain 184 such as, but not limited to, a tower shaft assembly. Here, a radial inner end 186 of the drivetrain 184 is coupled to the PT rotor 67 at an inner coupling location axially adjacent or near the intermediate location 102 of the mid-bearing 90D/ the bearing compartment 181. The drivetrain 184 of FIG. 8 is also arranged, axially along the axis 22 and/or fluidly along the core flowpath 52, between (A) the mid-support structure 106 and its internal passage 114 and (B) the water condenser 137. However, it is contemplated the drivetrain 184 may alternatively be arranged between (A) the water evaporator 136 and (B) the mid-support structure 106 and its internal passage 114. In either position, the mid-bearing 90D may support the coupling between the drivetrain 184 and the PT shaft 78. A radial outer end 188 of the drivetrain 184 is coupled to the accessory gearbox 182. The accessory gearbox 182 may be disposed outside of the outer case 110. The accessory gearbox 182 of FIG. 8, for example, is mounted to an exterior of the outer case 110. At least one mechanically driven accessory 190 (or multiple accessories) is attached to the accessory gearbox 182. Examples of the accessory 190 include, but are not limited to, a fluid pump (e.g., a lubricant pump, a fuel pump, etc.) and an electric machine (e.g., an electric generator).

The refrigerant condenser 138 of FIGS. 1 and 2 is described above as a discrete component from the water condenser 137. However, it is contemplated the refrigerant condenser 138 may alternatively be omitted. The water condenser 137, for example, may be extended into the bypass flowpath 50 and operable to transfer heat energy between the bypass air and the combustion products for condensing the water vapor out of the combustion products.

In some embodiments, referring to FIGS. 1 and 2, the engine core 34 may be arranged coaxial with the fan rotor 66 and the geartrain 74. The present disclosure, however, is not limited to such an exemplary arrangement. For example, a centerline of the engine core 34 may alternatively be angularly offset from and/or (e.g., radially) displaced from a centerline of the fan rotor 66 and/or a centerline of the geartrain 74.

Figure 9:
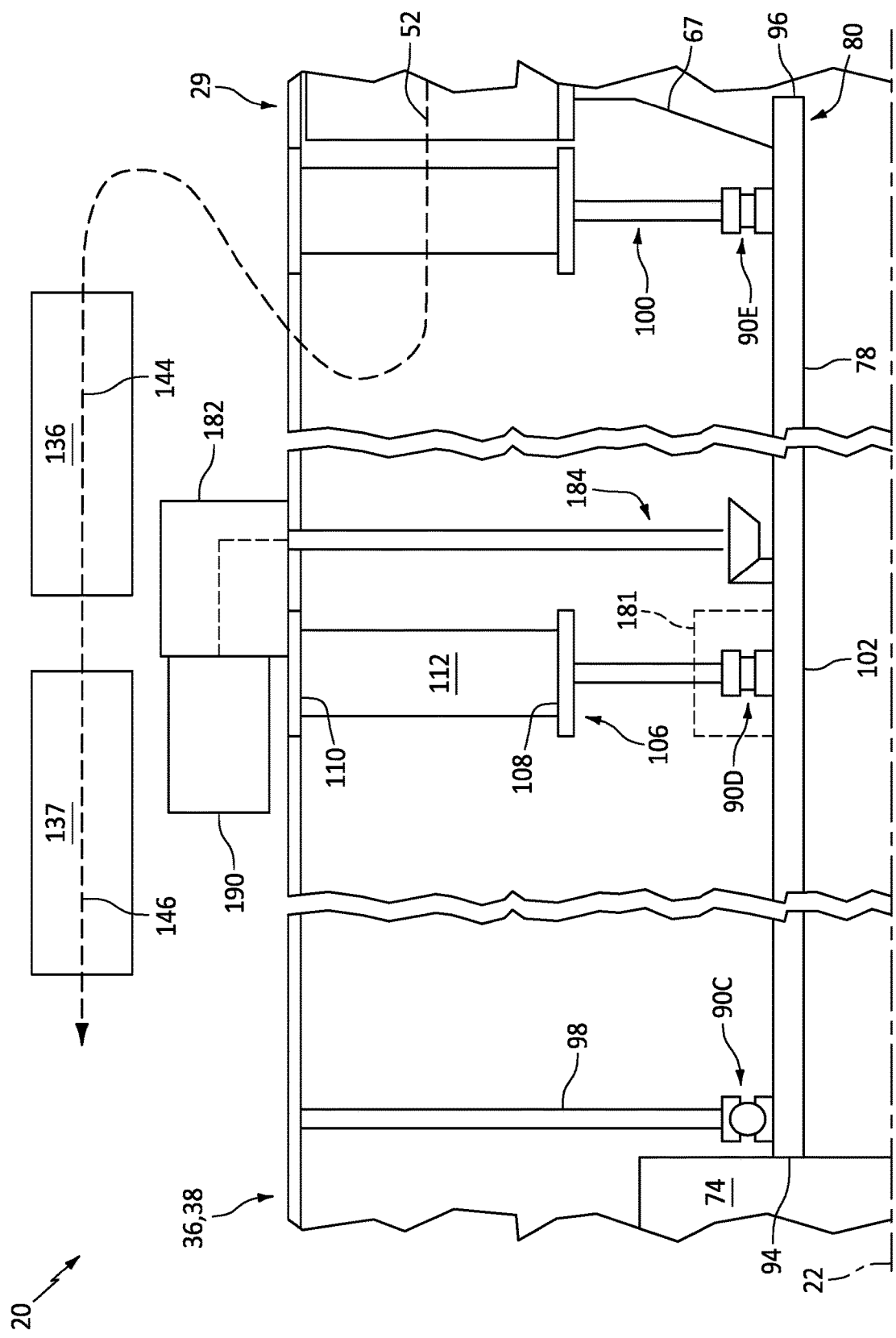
FIG. 9 is a partial schematic illustration of the turbine engine along the power turbine shaft where a core flowpath bypasses a mid-support structure supporting the power turbine shaft.

In some embodiments, referring to FIG. 3, the core flowpath 52 may extend (e.g., axially) across the mid-support structure 106; e.g., axially through the internal passage 114. In other embodiments however, referring to FIG. 9, the core flowpath 52 may be arranged discrete from the mid-support structure 106. The core flowpath 52, for example, may bypass (e.g., not extend through or otherwise across) the mid-support structure 106. The water evaporator 136 and/or the water condenser 137 of FIG. 9, for example, are arranged partially or completely outside of the outer case 110 and/or the (e.g., entire) housing inner structure 38. The space between the PT shaft 78 and the outer case 110 and/or the housing inner structure 38 may then be used to house various other engine accessories and/or components. Still alternatively, the turbine engine may be configured without the recovery system 134 of FIG. 5.

The turbine engine 20 is generally described above as a turbofan turbine engine. The present disclosure, however, is not limited to such an exemplary turbofan turbine engine configuration. The fan rotor 66, for example, may be configured as another type of propulsor rotor for generating propulsive thrust. Examples of other propulsor rotors include, but are not limited to, a propeller rotor and an un-ducted fan rotor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
a first rotating assembly including a propulsor rotor, a power turbine rotor and a power turbine shaft coupled with and axially between the propulsor rotor and the power turbine rotor;
a bearing rotatably supporting the first rotating assembly at an intermediate location along the power turbine shaft;
a turbine engine core including a second rotating assembly and a combustor, the second rotating assembly including a core compressor rotor and a core turbine rotor, and the power turbine rotor arranged axially between the propulsor rotor and the second rotating assembly;
a flowpath extending sequentially across the core compressor rotor, the combustor, the core turbine rotor and the power turbine rotor from an inlet into the flowpath to an exhaust from the flowpath;
an evaporator fluidly coupled between the power turbine rotor and the exhaust along the flowpath; and
a condenser fluidly coupled between the evaporator and the exhaust along the flowpath.

2. The turbine engine of claim 1, wherein the intermediate location is disposed along a middle one-half of the power turbine shaft.

3. The turbine engine of claim 1, further comprising
a forward bearing rotatably supporting the first rotating assembly at a forward end of the power turbine shaft; and
an aft bearing rotatably supporting the first rotating assembly at an aft end of the power turbine shaft;
wherein the bearing is a mid-bearing disposed axially between the forward bearing and the aft bearing.

4. A turbine engine, comprising:
a first rotating assembly including a propulsor rotor, a power turbine rotor and a power turbine shaft coupled with and axially between the propulsor rotor and the power turbine rotor;
a bearing rotatably supporting the first rotating assembly at an intermediate location along the power turbine shaft;
a turbine engine core including a second rotating assembly and a combustor, the second rotating assembly including a core compressor rotor and a core turbine rotor, and the power turbine rotor arranged axially between the propulsor rotor and the second rotating assembly;
a flowpath extending sequentially across the core compressor rotor, the combustor, the core turbine rotor and the power turbine rotor from an inlet into the flowpath to an exhaust from the flowpath, at least a portion of the power turbine rotor arranged axially between the propulsor rotor and the exhaust from the flowpath; and
a support structure including an inner case, an outer case and a plurality of struts arranged circumferentially about an axis in an array;
the inner case circumscribing and supporting the bearing;
the outer case circumscribing the inner case; and
each of the plurality of struts extending radially between and connected to the inner case and the outer case.

5. The turbine engine of claim 4, wherein the flowpath does not extend across the support structure.

6. The turbine engine of claim 4, wherein the flowpath extends across the support structure and radially between the inner case and the outer case.

7. The turbine engine of claim 6, wherein the support structure is disposed between the power turbine rotor and the exhaust along the flowpath.

8. A turbine engine, comprising:
a first rotating assembly including a propulsor rotor, a power turbine rotor and a power turbine shaft coupled with and axially between the propulsor rotor and the power turbine rotor;
a bearing rotatably supporting the first rotating assembly at an intermediate location along the power turbine shaft;
a turbine engine core including a second rotating assembly and a combustor, the second rotating assembly including a core compressor rotor and a core turbine rotor, and the power turbine rotor arranged axially between the propulsor rotor and the second rotating assembly; and
a flowpath extending sequentially across the core compressor rotor, the combustor, the core turbine rotor and the power turbine rotor from an inlet into the flowpath to an exhaust from the flowpath;
wherein the first rotating assembly further includes a second compressor rotor; and
wherein the second compressor rotor is disposed between the power turbine rotor and the exhaust along the flowpath.

9. The turbine engine of claim 8, wherein the second compressor rotor is axially between the propulsor rotor and the bearing.

10. The turbine engine of claim 4, further comprising:
an accessory gearbox; and
a drivetrain coupling the first rotating assembly to the accessory gearbox.

11. The turbine engine of claim 1, further comprising a support structure supporting the bearing and disposed between the evaporator and the condenser along the flowpath.

12. The turbine engine of claim 1, further comprising a second compressor rotor disposed between the evaporator and the condenser along the flowpath.

13. The turbine engine of claim 1, further comprising:
an accessory gearbox; and
a drivetrain coupling the first rotating assembly to the accessory gearbox, the drivetrain disposed axially between the evaporator and the condenser.

14. The turbine engine of claim 1, further comprising:
a recovery system including the condenser and the evaporator;
the condenser configured to condense water vapor flowing through the flowpath into water, and the recovery system configured to collect the water; and
the evaporator configured to evaporate at least some of the water into steam, and the recovery system configured to provide the steam to the turbine engine core.

15. A turbine engine, comprising:
a first rotating assembly including a propulsor rotor and a power turbine rotor;
a bearing rotatably supporting the first rotating assembly axially between the propulsor rotor and the power turbine rotor;
a turbine engine core including a second rotating assembly and a combustor, the second rotating assembly including a core compressor rotor and a core turbine rotor;
a recovery system including a condenser and an evaporator, the bearing disposed axially between the condenser and the evaporator; and
a flowpath extending sequentially across the core compressor rotor, the combustor, the core turbine rotor, the power turbine rotor, the evaporator and the condenser from an inlet into the flowpath to an exhaust from the flowpath.

16. The turbine engine of claim 15, further comprising:
a stationary support structure supporting the bearing and disposed axially between the condenser and the evaporator;
the flowpath further extending through the stationary support structure.

* * * * *